Oct. 23, 1962  C. L. KOMOROWSKI ETAL  3,059,960
MOTORIZED VEHICLE FOOT REST
Filed April 21, 1961  3 Sheets-Sheet 1

INVENTORS
Clarence L. Komorowski
BY & Fred Pessl

Bruce G. Klaas
ATTORNEY

Oct. 23, 1962 C. L. KOMOROWSKI ETAL 3,059,960
MOTORIZED VEHICLE FOOT REST
Filed April 21, 1961 3 Sheets-Sheet 2

INVENTORS
Clarence L. Komorowski
BY & Fred Pessl

Bruce G. Klaas
ATTORNEY

INVENTORS
Clarence L. Komorowski
& Fred Pessl
BY
Bruce G. Klaas
ATTORNEY 3,059,960
MOTORIZED VEHICLE FOOT REST
Clarence L. Komorowski, Detroit, and Fred Pessl, Grosse Pointe Woods, Mich., assignors to General Motors Corporation, Detroit, Mich., a corporation of Delaware
Filed Apr. 21, 1961, Ser. No. 104,612
7 Claims. (Cl. 296—65)

This invention relates to a foot rest and, more particularly, to a vehicle foot rest which is positionable in response to adjustment of an associated vehicle seat back.

The principal object of this invention is to provide a vehicle foot rest which may be adjustably positioned. Another object of this invention is to provide a vehicle foot rest which is automatically adjustable in a predetermined manner in response to adjustment of an associated vehicle seat back. Still another object of this invention is to utilize seat adjuster equipment to actuate a vehicle foot rest to an adjuster position during adjustment of a vehicle seat back.

Other objects and advantages of this invention are disclosed in the following detailed description and accompanying drawings wherein.

Figure 1:
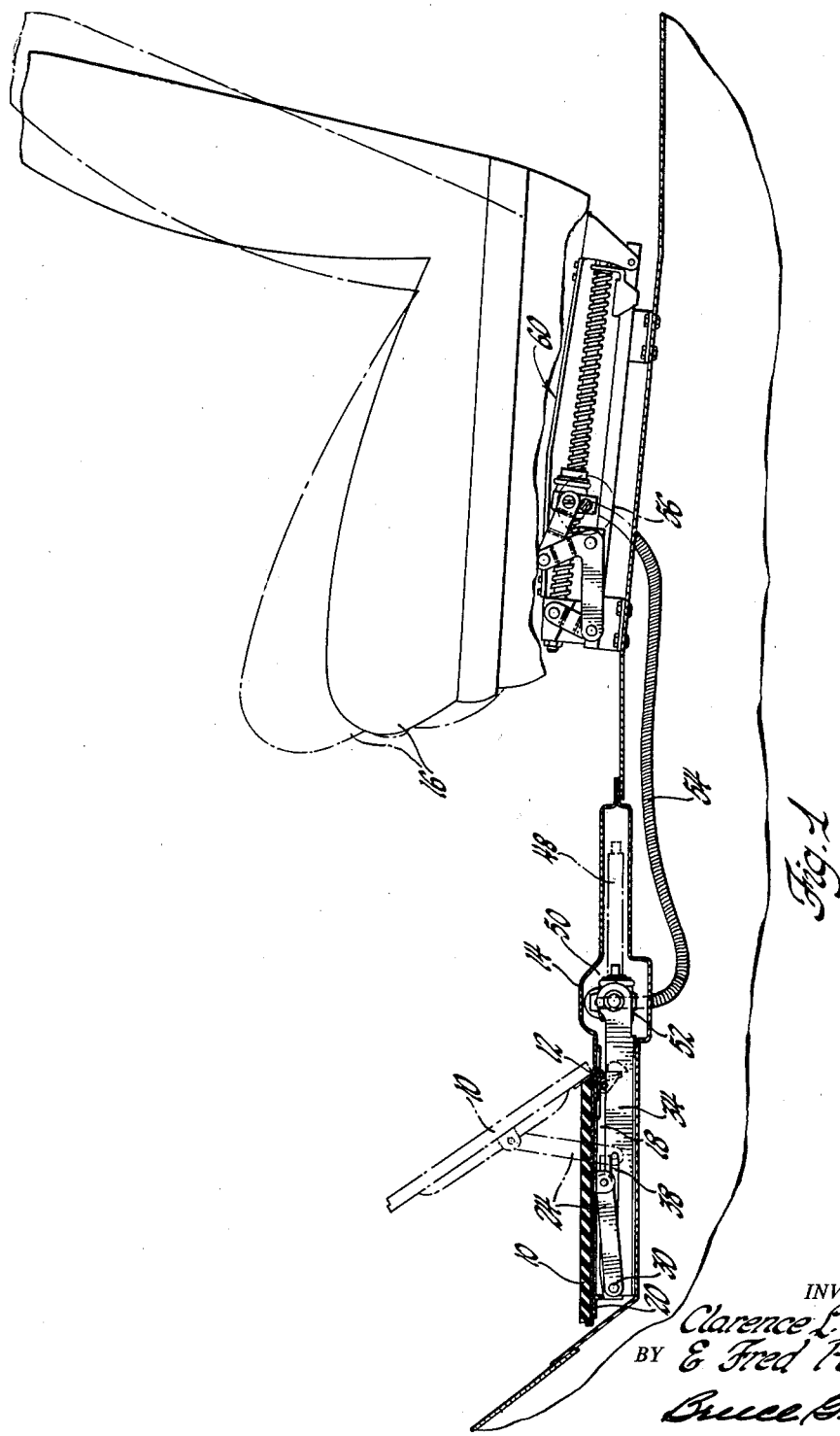
FIGURE 1 is a side elevational view, partly in section, of apparatus embodying the present invention.
Figure 2:
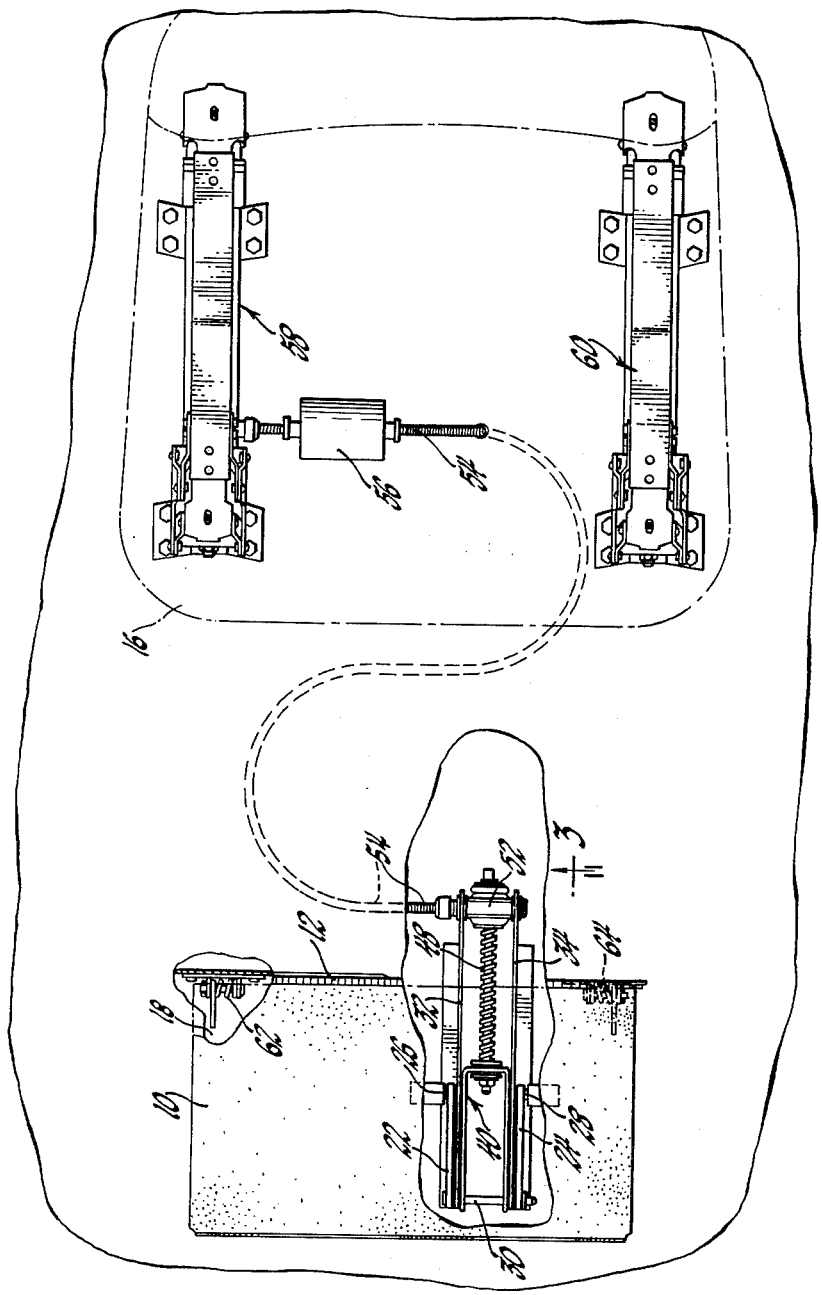
FIGURE 2 is a plan view of the apparatus shown in FIGURE 1.
Figure 3:
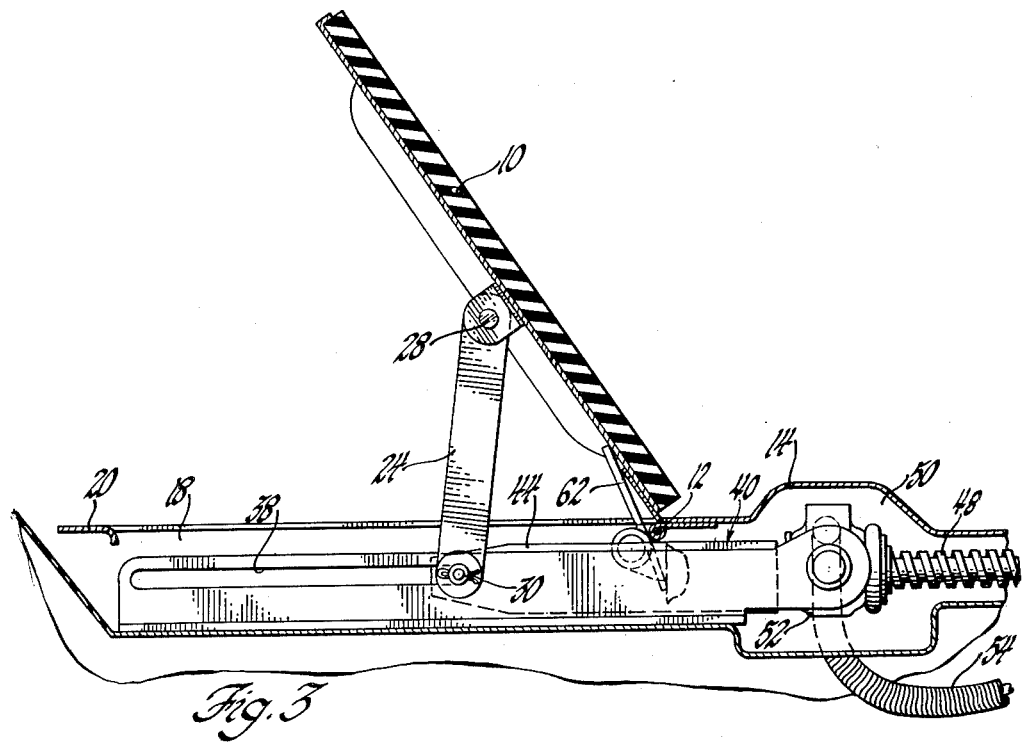
FIGURE 3 is an enlarged sectional view taken along the line 3—3 in FIGURE 2 showing the foot rest in a raised position.
Figure 4:
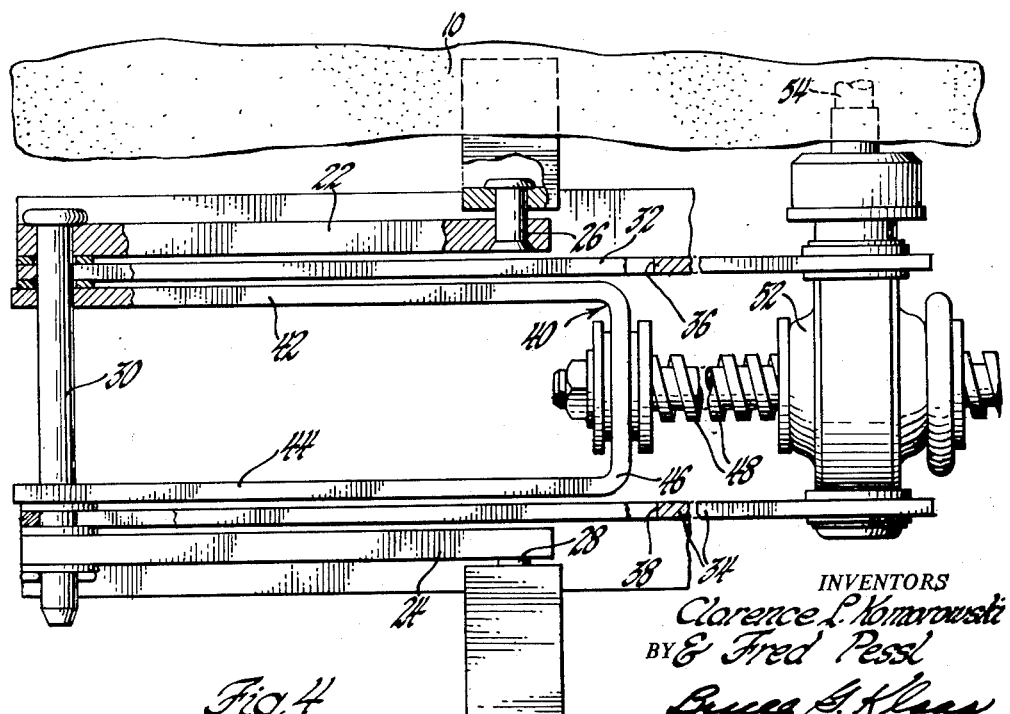
FIGURE 4 is an enlarged view of a portion of the apparatus shown in FIGURE 2.

Referring now to the drawings, a vehicle foot rest 10 is pivotally secured by a pin member 12 to a portion of a vehicle floor pan 14 in front of the extreme forward position of a vehicle seat 16. A well or depression 18 is provided in the floor pan 14 beneath the foot rest 10 and is sufficiently deep to house actuating linkage for the foot rest. The forward end of the well is provided with a seat 20 which receives the end of the foot rest in the lowermost position. A pair of links 22, 24 are pivotally secured by pin members 26, 28 to the lower surface of the foot rest 10 and are pivotally mounted on a guide pin 30. A pair of spaced guide plates 32, 34 are secured in the well 18 and extend longitudinally thereof. Guide slots 36, 38 are provided in the guide plates and slidably receive the guide pin 30. A yoke member 40 has spaced leg portions 42, 44 secured at their extremities to the guide pin. The web portion 46 of the yoke member is secured to a jackscrew 48 which extends rearwardly from the well 18 beneath the floor pan 14 within a suitable housing 50. A worm unit 52 is drivingly connected to the jackscrew within the housing 50 and is driven by a flexible cable 54 which extends beneath the floor pan and which is connected to a seat adjuster motor 56 and driven thereby. The motor 56 may be located between conventional seat adjuster units 58, 60 and actually connected thereto in any suitable manner to provide for fore and aft adjustment of the seat unit and vertical inclination of the seat unit back. Actuation of the flexible cable 54 by the seat adjuster motor is suitably correlated with movement of the seat due to actuation of the seat adjuster motor so that the foot rest 10 will be inclined in a predetermined manner to provide the most suitable angle of inclination for any particular seat adjustment. In this manner, the foot rest will be raised as the seat is adjusted rearwardly and will be lowered as the seat is adjusted forwardly.

In operation with the seat 16 in a normal driving position, the foot rest 10 will be in its lowermost position in engagement with the seat 20 and substantially parallel to the floor pan 14. In this position, the actuating links 22, 24 are substantially parallel to the foot rest and the jackscrew 48 is in its furthest forward position so that the guide pin 30 is positioned closely adjacent the forward wall of the well 18. As the seat adjuster motor 10 is actuated to move the seat rearwardly and/or to tilt the seat back rearwardly, the flexible cable 54 will also be actuated to actuate the worm 52 and thereby drive the jackscrew 48 rearwardly. As will be seen, rearward movement of the jackscrew 48 causes rearward movement of the yoke 40 and the guide pin 30 to rotate the actuating links 22, 24 upwardly about the pivot pin members 26, 28 and about the guide pin 30. The linkage movement causes the vehicle foot rest 10 to be gradually rotated upwardly about the pivot pin member 12. Thus, the foot rest is inclined in direct response to adjustment of the vehicle seat to provide a more comfortable floor board angle for various adjusted positions of the vehicle seat. Torsion springs 62, 64 may be provided to bias the foot rest upwardly and insure a smooth upward movement of the foot rest. Reverse movement of the seat adjuster motor will cause the vehicle foot rest 10 to move downwardly in a reverse manner until seated on the flange 20 in a flat out-of-the-way position. The vehicle floor covering (not shown) may be arranged around the foot rest and over the floor pan to provide a smooth surface extending beneath the vehicle seat.

It is comprehended that various modifications of the details of construction and arrangement of the parts of the illustrative embodiment may be made without inventive skill and are intended to be within the scope of this invention as defined by the appended claims.

We claim:

1. In a vehicle: seat adjusting mechanism comprising a seat unit, adjusting units secured to the floor of said vehicle to variably position said seat unit, power means to actuate said adjusting units, a floor panel pivotally supported adjacent the front of said seat unit and forming a portion of the floor of said vehicle, floor panel actuating mechanism for moving said floor panel from a lowered floor extension forming position to an upright foot rest forming position, and means interconnecting said power source and said floor panel actuating mechanism to variably position said floor panel in predetermined relationship relative to adjustment of said seat unit by said adjusting units.

2. In combination with a vehicle seat having adjusting apparatus to tilt said seat and a power source to actuate said apparatus, a floor panel, a first means to pivotally support said floor panel on the vehicle floor in front of said vehicle seat, said floor panel being positioned for supporting engagement with a vehicle occupant's foot, a second means to rotate said floor panel from a position closely parallel to said vehicle floor to a position inclined relative thereto, and a third means interconnecting said second means and said power source, said third means being responsive to the adjusted position of said seat to variably inclinably position said floor panel in accordance with the adjusted position of said seat.

3. Vehicle seating apparatus comprising a seat, a seat back, adjuster mechanism to variably position said seat and seat back and including means to incline said seat and seat back, a power source connected to said means to incline said seat and seat back, a foot panel pivotally secured to the vehicle floor adjacent the front of said seat and positioned for supporting engagement with the feet of an occupant of the seat, actuating mechanism operably connected to said foot panel, said actuating mechanism being supported beneath the floor panel, and power transfer mechanism connecting said actuating mechanism with said power source to simultaneously incline said foot panel in direct proportion to and during the inclination of said seat and seat back.

4. Vehicle seating apparatus comprising a seat, adjuster mechanism to variably position said seat relative to the floor of said vehicle, a power source connected to said adjuster mechanism, a foot panel pivotally secured adjacent the front of said seat and forming a portion of the floor of said vehicle and being positioned for supporting engagement with the feet of an occupant of the seat, actuating mechanism operably connected to said foot panel, said actuating mechanism being connected to said power source, and said actuating mechanism being actuable by said power source to simultaneously actuate said foot panel in response to and during actuation of said seat by said adjuster mechanism.

5. The apparatus as defined in claim 4 and wherein: said actuating mechanism comprises a jackscrew, a worm actuably connected to said jackscrew, linkage means pivotally connecting said jackscrew and said foot panel, and actuating mechanism housing provided beneath said foot panel and the floor of said vehicle, and said actuating mechanism being supported within the confines of said housing when said foot panel is in its lowermost position.

6. In combination with a vehicle seat having seat adjusting apparatus to variably position said seat and a power source to actuate said adjusting apparatus, a foot panel movably secured to the vehicle floor adjacent said vehicle seat and being variably positionable for supporting engagement with the feet of an occupant of the seat, actuating mechanism for variably positioning said foot panel between a position closely parallel to an adjacent portion of the vehicle floor on which said vehicle seat is mounted to a position inclined relative thereto, and power transfer means interconnecting said power source and said actuating mechanism to variably position said foot panel in accordance with the position of adjustment of said vehicle seat.

7. The apparatus as defined in claim 6 and wherein said power source comprises electric motor means; said actuating mechanism comprises movable jackscrew means, linkage connected to said foot panel and movably actuable by said jackscrew means, nut means mounted on said jackscrew means to cause relative movement therebetween, and said power transfer means being a flexible cable connecting said nut and to said power source means to cause the relative movement simultaneously with actuation of said seat adjusting apparatus.

References Cited in the file of this patent

UNITED STATES PATENTS

| | | |
|---|---|---|
| 879,646 | Jones | Feb. 18, 1908 |
| 2,032,157 | Van Dresser et al. | Feb. 25, 1936 |
| 2,491,898 | Luketa | Dec. 20, 1949 |